United States Patent [19]
Johnson

[11] 4,370,022
[45] Jan. 25, 1983

[54] BICONICAL OPTICAL WAVEGUIDE SPLICE

[75] Inventor: Tore R. Johnson, Harrisburg, Pa.

[73] Assignee: AMP Incorporated, Harrisburg, Pa.

[21] Appl. No.: 174,319

[22] Filed: Aug. 1, 1980

[51] Int. Cl.³ .................................................. G02B 7/26
[52] U.S. Cl. ................................................... 350/96.21
[58] Field of Search ................. 350/96.20, 96.21, 96.22

[56] References Cited

U.S. PATENT DOCUMENTS

| | | | |
|---|---|---|---|
| 3,989,567 | 11/1976 | Tardy | 350/96.21 X |
| 4,019,241 | 4/1977 | Logan | 350/96.21 X |
| 4,047,796 | 9/1977 | Kao et al. | 350/96.21 |
| 4,050,781 | 9/1977 | Beauhaire | 350/96.21 |
| 4,056,305 | 11/1977 | McCartney et al. | 350/96.21 |
| 4,061,416 | 12/1977 | Stewart | 350/96.21 |
| 4,062,624 | 12/1977 | Hammer | 350/96.21 |
| 4,087,155 | 5/1978 | Deacon | 350/96.21 |
| 4,094,580 | 6/1978 | Cook et al. | 350/96.21 |
| 4,161,347 | 7/1979 | Tardy | 350/96.21 |
| 4,192,575 | 3/1980 | Hodge | 350/96.21 |

FOREIGN PATENT DOCUMENTS 2602661 7/1977 Fed. Rep. of Germany ... 350/96.21
52-77736 6/1977 Japan ................................. 350/96.21

*Primary Examiner*—John D. Lee
*Attorney, Agent, or Firm*—Adrian J. LaRue

[57] ABSTRACT

A field appliable connector for splicing a pair of optical waveguides is disclosed. Three stepped profiled, parallel rods are adapted having larger diametered end portions, with smaller diametered segments extending therebetween. Radially compressive means is disclosed for preliminarily biasing the smaller diametered segments inwardly, whereby an interstitial passageway defined between the rods is made to assume a biconical profile for accommodating guided entry of two waveguides therein. Subsequently, further radial crimping of the smaller diameter rod segments proximate the abutment of the waveguide ends establishes a peripheral clamp upon the waveguides and effectuates their colinear axial alignment.

13 Claims, 11 Drawing Figures

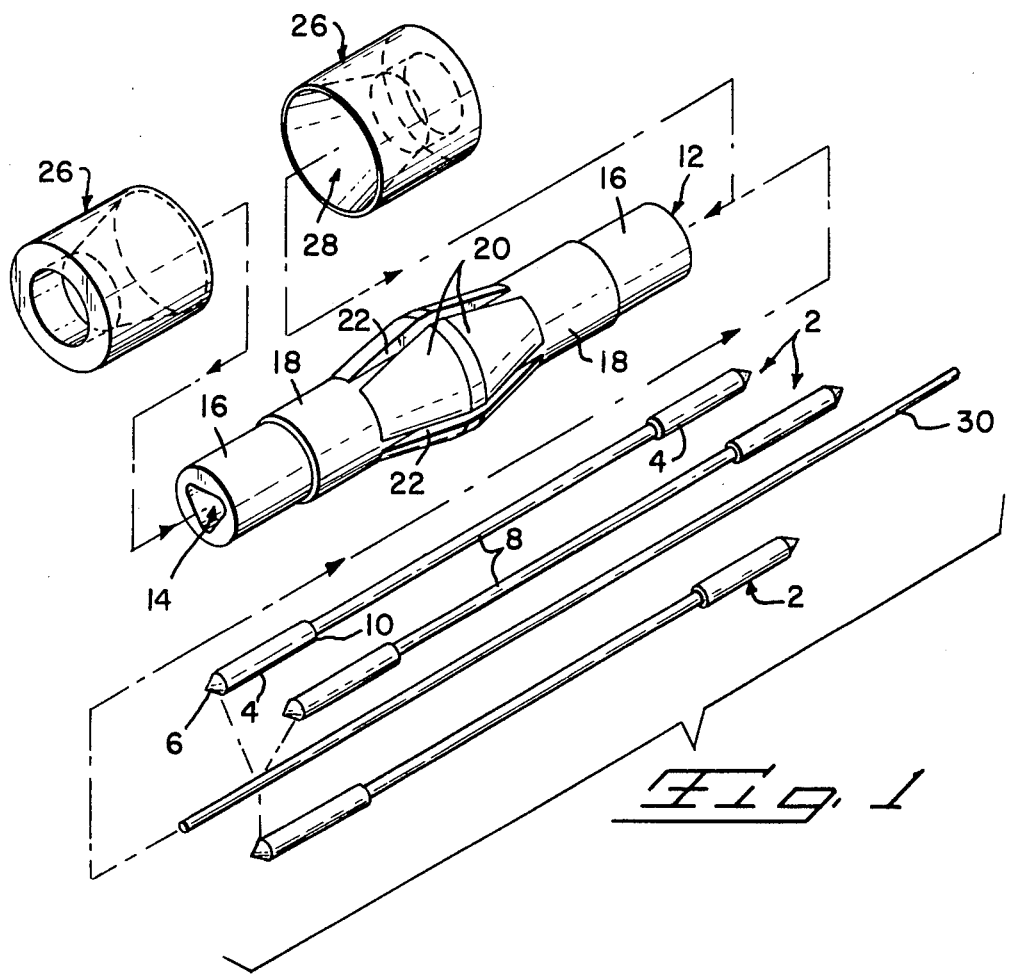
Fig. 1
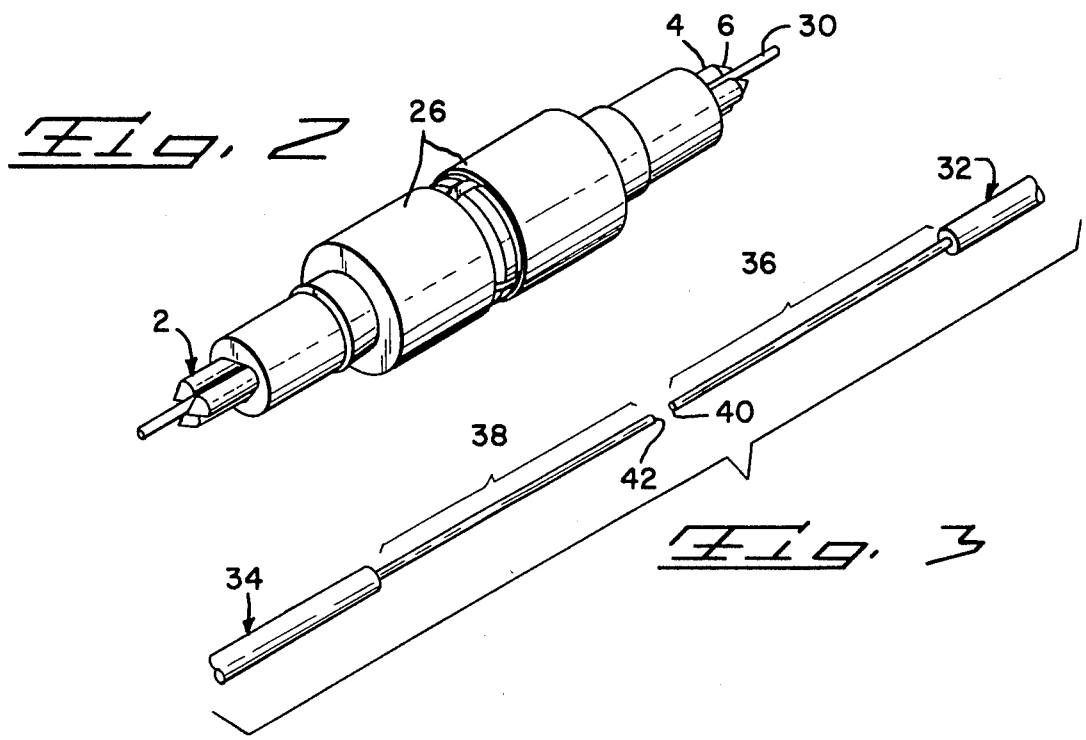
Fig. 2
Fig. 3

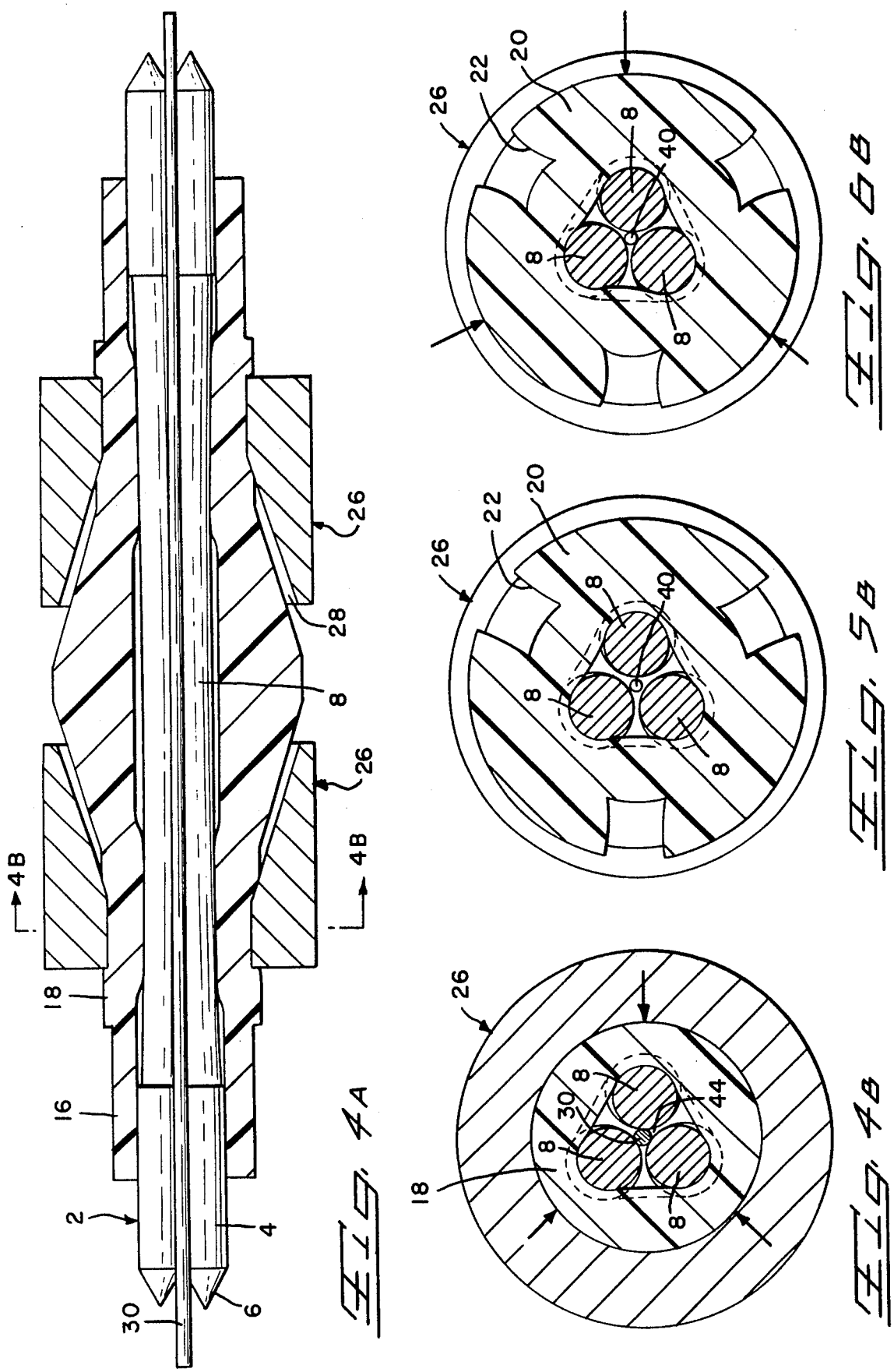

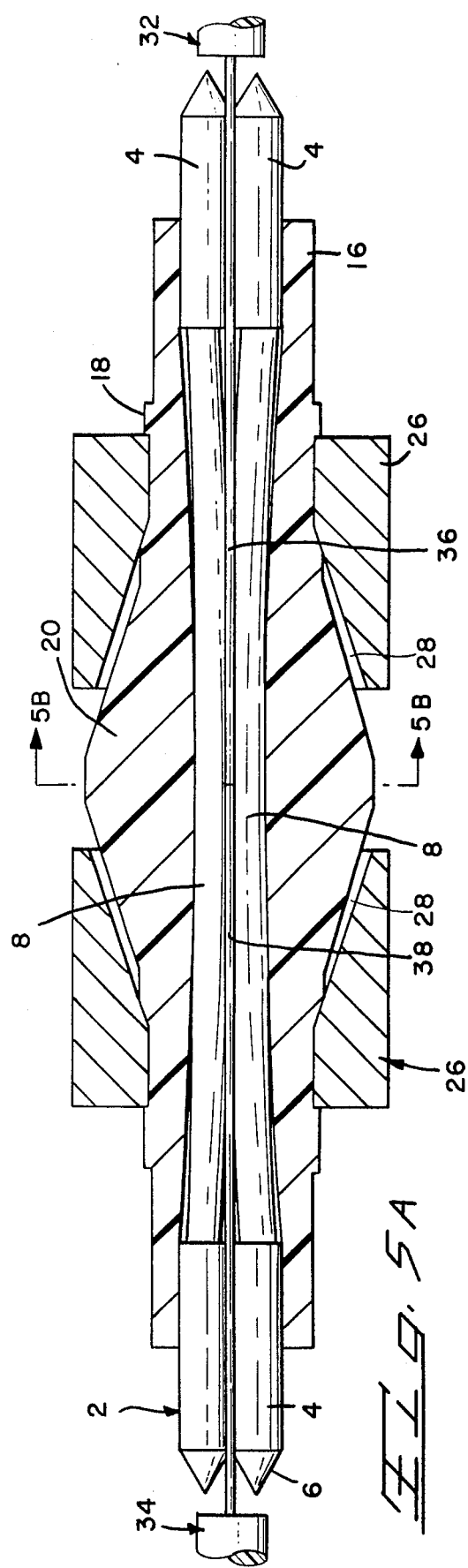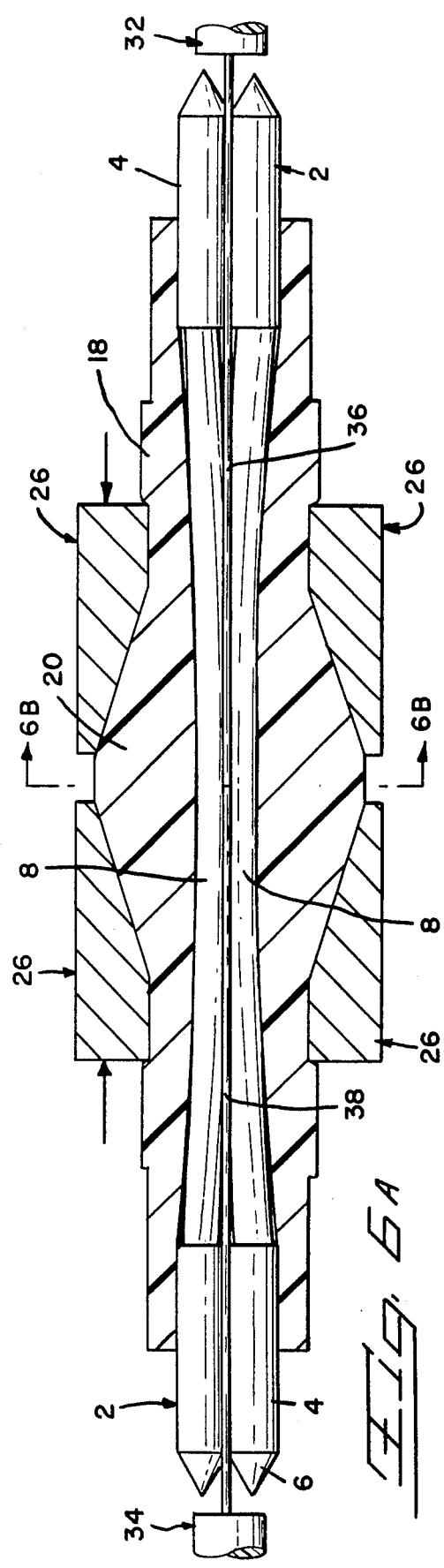

BICONICAL OPTICAL WAVEGUIDE SPLICE

BACKGROUND OF THE PRESENT INVENTION

1. The Field of the Present Invention

The present invention relates generally to optical connectors for colinear alignment of the axis of a pair of optical waveguides. More specifically, the invention resides in the general field of optical connectors which utilize a three rod alignment technique in achieving said colinear alignment of waveguides.

2. The Prior Art

The communications industry has long been in need of a field applicable optical waveguide splice which meets stringent optical and mechanical performance criteria, which is inexpensive to manufacture, physically compact, and readily applied requiring little or no specialized tooling. Attempts to achieve such a device has spawned numerous interconnection technologies, no one of which, however, being totally successful to date in satisfying all of the industry's requirements.

One approach examined has been the heat fusion of optical fibers in effectuating a low loss splice. This technique, however, it less than ideal since it is difficult to adapt to field application. Other, purely mechanical, alignment technologies circumvent the disadvantages of heat fusion, but fail to meet either the performance, cost, or size objectives outlined above.

One promising alignment technique which has been incorporated into mateable connectors known in the art, embodies a pair of mating connector halves, each comprising three or more elongate cylindrical rods which are mutually positioned to define an interstitial passageway therebetween for receiving a respective waveguide therein. The rods are radially clamped together and against the waveguides by any one of a number of methods, and subsequently, the ends of the three rods of one connector half are aligned with corresponding ends of the rods of the opposite half, to colinearly align the axis of the waveguides and accomplish their colinear presentation. Heretofore, however, no satisfactory field applicable splice has been achieved which utilizes this alignment technique.

SUMMARY OF THE PRESENT INVENTION

A field appliable splice for optically and mechanically coupling a pair of waveguides is disclosed, which utilizes a cylindrical three rod alignment technique. Three stepped profiled parallel rods are adapted having larger diametered end portions, with smaller diametered segments extending therebetween. A radially compressive tubular body is disclosed for receiving the three rods therethrough, and crimping means is provided for preliminarily biasing the smaller diameter rod segments inward, whereby an interstitial passageway between the rods is made to assume a biconical profile for accommodating guided entry of two waveguides therein, each from an opposite end. Subsequently, the crimping means further influences the smaller diametered rod segments inward, and the rod segments thereby establish a peripheral clamp upon the waveguides to effectuate their colinear axial alignment. The crimping means can be disengaged and re-utilized, in order to accommodate the repair or replacement of any one of the terminated waveguides.

Accordingly, it is an object of the present invention to provide a field appliable splice for efficient optical coupling of a pair of waveguides.

A further object of the present invention is to provide a field appliable splice for achieving positive mechanical coupling of a pair of optical waveguides.

Still further, an object of the present invention is to provide a field appliable splice for coupling optical waveguides which is field repairable.

Yet a further object of the present invention is to provide a field appliable splice for coupling a pair of optical waveguides which requires little specialized termination tooling.

Yet a further object of the present invention is to provide a field appliable splice for coupling a pair of optical waveguides which is physically compact.

Still further, an object of the present invention is to provide a field appliable splice for coupling optical waveguides which is readily applied.

A further object of the present invention is to provide a field appliable splice for coupling a pair of optical waveguides, which is economically and readily produced.

These and other objects, which will become apparent to one skilled in the art, are achieved by a preferred embodiment which is described in detail below, and which is illustrated in the accompanying drawings.

BRIEF DESCRIPTION OF THE ACCOMPANYING DRAWINGS

FIG. 1 is an exploded perspective view of the subject splice, showing a shipping wire intended for use as a substitute for the optical waveguides prior to utilization of the splice in a field application.

FIG. 2 is a perspective view of the assembled splice illustrated in FIG. 1, with the shipping wire in place, and in the fully crimped position.

FIG. 3 is a perspective view of a pair of optical waveguides dressed for termination by the subject optical splice.

FIG. 4A is a longitudinal section view through the optical splice illustrated in FIG. 2, showing the shipping wire in place, and in a preliminarily crimped position.

FIG. 4B is a transverse section view taken along the line 4B—4B of FIG. 4A, illustrating the alignment rod configuration and shipping wire in a preliminary crimped position.

FIG. 5A is a longitudinal section view through the subject optical splice, with the shipping wire removed and the pair of optical waveguides substituted therefore.

FIG. 5B is a transverse section view taken along the line 5B—5B of FIG. 5A illustrating the alignment rod configuration with respect to the optical waveguide extending therebetween.

FIG. 6A is a longitudinal section view through the subject optical splice, with the crimping collars moved inward into a final crimped position.

FIG. 6B is a transverse section view taken along the line 6B—6B of FIG. 6A, illustrating the alignment rod configuration in a final crimp condition, and the optical waveguides held therebetween.

DETAILED DESCRIPTION OF THE PREFERRED EMBODIMENT

Figure 7:
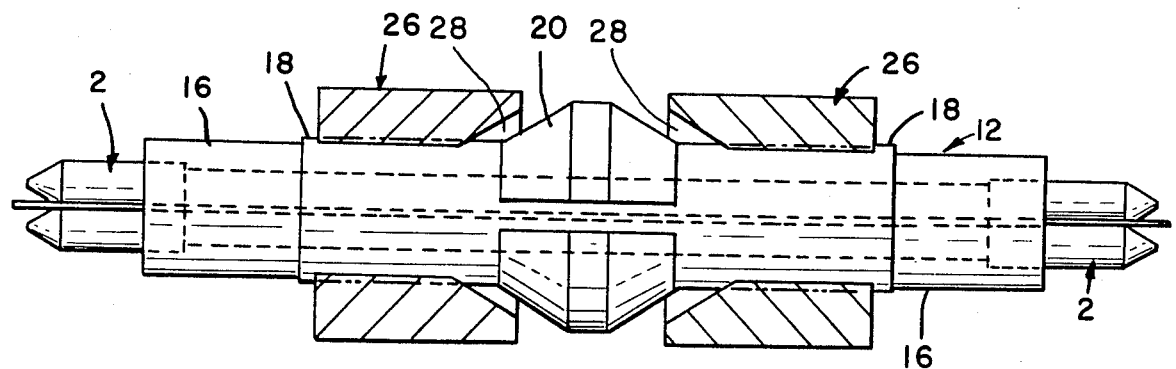
FIG. 7 is a transverse section view through an alternative embodiment of the present invention, showing an alternative crimping profile in the pre-crimped condition.

Referring first to FIG. 1, the preferred embodiment of the subject invention comprises three elongate cylindrical rods 2, preferably formed of resilient metallic or plastics material, each of which having larger diametered end portions 4 tapering to a conical tip 6, and a smaller diametered intermediate segment 8 integrally joined to the larger diametered portions by an integral step 10. An elongate tubular elastomeric body 12 is provided having an axial profiled sectioned passageway 14 extending therethrough, and an external profile comprising a first peripheral step 16, a second peripheral step 18, and circumferential, intermediately located, retention cones 20. The retention cones 20 are outwardly flared, and extend about the periphery of the tubular body 12. Adjacent cones 20 are separated by an axially directed slot 22.

A pair of biconical crimping collars 26 further comprise components of the present invention, each crimping collar having a bore 28 extending therethrough. The bore 28 has a truncated conical profile for a purpose to be explained in greater detail below. A cylindrical shipping wire 30 is provided for intended incorporation in the manufactured connector illustrated in FIGS. 1 and 2, and serves to preserve the integrity of the alignment channel of the connector during shipment prior to the in field coupling of optical waveguides.

The present invention in the manufactured and pre-shipment condition is illustrated in FIG. 2, with the shipping wire 30 located in the interstitial passageway between the three parallel and aligned rods 2. The rods are located within the passageway 14 of the tubular body 12, and it will be appreciated that the sectional dimension of the passageway 14 of the tubular body 12 is such that the larger diametered end portions 4 of the rods 2 are held in appropriate contacting and parallel relationship. The shipping wire, located between the rods 2, ensures the integrity of the interstitial passageway defined thereby, prior to in field termination of fiber optic waveguides. A pair of optical waveguides, of the type intended to be used in conjunction with the present invention, are illustrated in FIG. 3 at numerals 32, 34, each of the waveguides being preparatorily dressed to provide an exposed forward core length 36, 38, respectively, each having a forward end surface 40, 42.

Proceeding with reference to FIGS. 2 and 4A, assembly of the present invention proceeds as follows. The three elongate rods 2 are inserted within the tubular shell body 12, with the crimping collars 26 mounted over opposite ends of the body 12 as indicated in FIG. 4A. It will be appreciated that the sectional dimension of the passageway 14 of the tubular body 12, is such that the larger diametered end portions 4 of the rods 2 are held in a contacting parallel relationship. The sectional configuration of the assembled connector is illustrated in 4B, with the interstitial passageway defined by the elongate rods 2 being designated as numeral 44 for the purposes of illustration. As shown by FIGS. 2 and 4A, the cylindrical shipping wire 30 is inserted between the elongate rods 2 and into the interstitial passageway 44 therebetween. Thereafter, as illustrated in FIG. 4A, both of the crimping collars 26 are simultaneously moved inwardly and establish interference engagement with the second peripheral step 18 of the tubular body 12. Engagement between the crimping collars 26 and the peripheral step 18 causes radial compression forces to be exerted upon the tubular body 12, which further causes an inward radial deflection of the smaller diametered intermediate segments 8 of the parallel rods 2. The degree of inward deflection of the segments 8 is controlled by the presence of the shipping wire 30 within the interstitial passageway 44. So situated, the shipping wire 30 functions to prevent an over construction of the passageway 44 during assembly and shipment of the connector assembly. It will be appreciated from viewing FIG. 5A, that the preliminary crimp described above between the crimping collars 26 and the second integral step 18, causes the interstitial passageway 44 between the inwardly deflected rod segments 8, to assume a biconical profile. Accordingly, the truncated conical profile from each end of the passageway 44 permits easy insertion of the exposed core length 36, 38, of a respective waveguide therein. Further, it will be apparent from FIG. 5B that in the preliminary crimped condition, the optical waveguides 36, 38 within the interstitial passageway 44, are in a relatively loose containment.

Proceeding to FIGS. 6A and 6B, the crimping collars 26 are further moved inwardly into a final crimped condition, with the interior truncated profile of the crimping collar bore 28 engaging against the outwardly flared retention cones 20 of the tubular body 12. Such engagement increases the radial compression forces upon the elastomeric tubular body 18, and thereby causes a further deflection of the midportions of the rod segments 8 inwardly. This inward deflection of the rod segments 8 causes their midportions to engage against the exposed waveguide segments 36, 38 extending therethrough, whereby each waveguide segment 36, 38 is peripherally engaged and clamped between all three of the rod segments 8. Such a condition is illustrated in section by 6B, and it will be noted that the interstitial passageway 44 in the final crimped condition is substantially dimensioned to the diameter of the waveguides. The interior truncated profile of the crimping collars 26 is designed to engage against the tapered external surface of the retention cones 20, and the angle of taper of the two bodies are selected such that the crimping collars 26 will lock against the tapered retention cones 20, thereby preventing any relaxation of the crimping pressure upon the tubular body 12. It will be apparent that the clamping of the rod segments 8 upon the exposed waveguides procedes from ends of the splice toward the middle, and is concentrated at the forward ends of the waveguides, where alignment is critical. The forward ends of the optical waveguides are clamped between common rod segments, and their axial alignment is thereby achieved.

FIG. 7 illustrates an alternative embodiment of the present invention, in which the external profiled features of the tubular body 12 and the crimping collars 26 have been changed as follows. The angled outward taper of the retention cones 20, which are engaged by the inward taper of the crimping collar bores 28, are more severe in the alternative embodiment depicted in FIG. 7. A steeper angle of engagement eliminates the locking between the crimping collars 26 and the protuberances 20, if elimination of this feature is desired by the user of the splice. In all other respects, however, the alternative embodiment of FIG. 7 is like the preferred embodiment described above; it functions in the identical manner in that the smaller diameter rod segments are initially deflected inwardly against a shipping wire in the pre-crimped condition. Thereafter, as described above, the shipping wire is removed and the waveguides are inserted, and the crimping collars are simultaneously moved inwardly into increasing interference engagement with the tubular body to effectuate the final crimping forces upon the rod segments.

Figure 8:
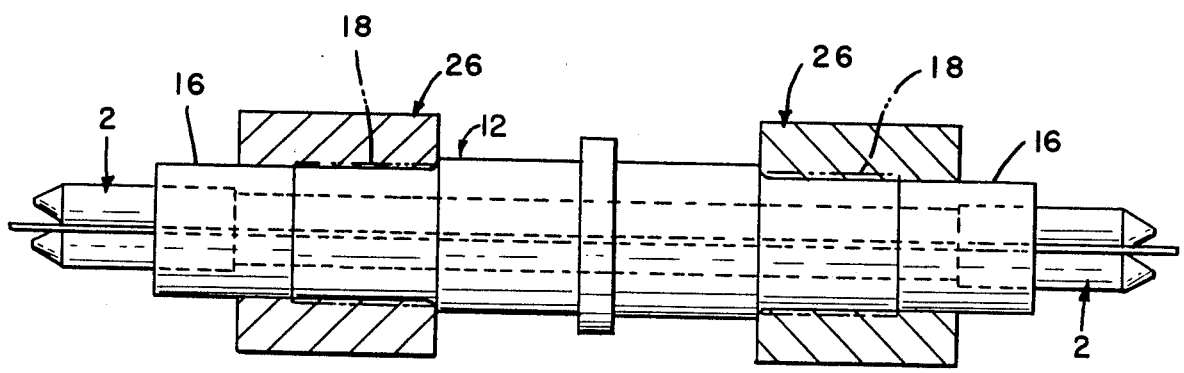
FIG. 8 is a transverse section view through a second alternative embodiment of the present invention, showing one half of the splice in the final deflected crimped position, and the other half of the alternative embodiment splice in the initially deflected pre-crimp position.

FIG. 8 illustrates yet another embodiment of the present invention in which the external crimping profile of the tubular body and the crimping collars have been modified somewhat. A straight forward stepped profile tubular body 12 is illustrated in FIG. 8, and a right cylindrical crimping collar is illustrated in engagement thereagainst. Likewise as described above, progressive crimping of the tubular body 12 is effectuated by the progressive simultaneous inward engagement of the crimping collars 26. The optical waveguides extending through the interstitial passageway defined by the rods are accordingly clamped in progressive fashion.

Viewing FIGS. 5A and 6A, it will be apparent that the crimping collars may progressively engage against the profile of body 12 by use of relatively simple application tooling. For example, a vise-like hand tool may be used for the necessary simultaneous inward movement of the collars 26 into the final crimped condition. Also, it will be noted that the collars may be disengaged, moved outward, and then re-applied to facilitate repair of the waveguides if necessary. Thus, the present splice is field applicable by comparatively simple tooling, yet repairable if a retermination of the waveguides becomes necessary.

Several further observations will be obvious from a combined consideration of FIGS. 4A, 5A, and 6A. First, the oversized end diameter of the rods provides an oversized interstitial passageway for easy guided insertion of the waveguide therein.

Secondly, the oversized end diameter of the rods enables an inward deflection of the intermediate rod segments, and the resultant formation of the biconical profiled interstitial passageway therebetween. Also, it will be apparent that the clamping forces exerted by the rods are directed upon the ends of the waveguides due to the direction and location of the crimp. Thus, the alignment function achieved by the three rods is optimally located at the waveguide end juncture, to achieve optimal results in coupling efficiency.

The alternative embodiments depicted in FIGS. 7 and 8, illustrate but several of the many variations in crimping profiles which will become apparent to one skilled in the art upon a reading of the teachings herein set forth. The principles of the subject invention, may find application in various alternative and obvious embodiments, and the scope and the spirit of the present invention is not to be confined solely to the embodiments herein set forth.

What is claimed is:

1. A fiber optic connector for connecting ends of optical waveguide members, comprising:
   tubular body means having an axial profiled passageway means extending therethrough and an external profile including peripheral step means;
   rod means disposed in said axial profiled passageway means, said rod means including larger diametered ends and smaller diametered intermediate segments, said larger diametered ends being in engagement and located within end sections of said passageway means, said smaller diametered intermediate segments extending along said axial profiled passageway means and normally spaced from each other, said rod means providing interstitial passageway means therealong and along which the optical waveguide members are positioned with their ends adjacent each other;
   crimping collar means disposed on said external profile for movement relative to said tubular body means thereby applying radial compression forces to said tubular body means causing inward radial deflection of said smaller diametered intermediate segments onto the optical waveguide members.

2. A fiber optic connector as set forth in claim 1 wherein said tubular body means is an elastomeric member.

3. A fiber optic connector as set forth in claim 1 wherein the outer ends of said larger diametered ends are tapered.

4. A fiber optic connector as set forth in claim 1 wherein retention cone means are located on said external profile which are engageable by said crimping collar means.

5. A fiber optic connector as set forth in claim 1 wherein said interstitial passageway means assumes a biconical profile when said crimping collar means has deflected said smaller diametered intermediate segments onto the optical waveguide members.

6. A connector for colinear axial alignment of a pair of optical waveguides, comprising:
   at least three elongate resilient rod members in parallel relationship defining an interstitial passageway therebetween, each of said rod members having a larger diameter at first and second opposite ends thereof, and a smaller diameter segment intermediate said ends, said passageway admitting respective waveguides therein from each said end, with forward end surfaces of said waveguides positioned in an opposed adjacent location intermediate of said rod members' length;
   means for radially influencing said smaller diametered rod segments inwardly into peripheral engagement against said waveguides, whereby both said waveguides are engaged by and clamped between said rods in colinear axial alignment with each other.

7. A connector as set forth in claim 6, said means comprising radially compressible tubular means having an axial passageway therethrough receiving said rods, said passageway being sectionally profiled for holding said rods in said parallel relationship.

8. A connector as set forth in claim 7 wherein said tubular means further comprising a sleeve of elastomeric material having an external stepped profile.

9. A connector as set forth in claim 8, wherein said means further comprising crimping means peripherally engaging against and radially compressing said tubular means inward against said rods.

10. A connector as set forth in claim 9, said crimping means comprising a pair of crimping collars each mounted over a respective end of said sleeve, and movable inwardly towards the other said collar and into progressive interference engagement with said stepped profile of said sleeve, whereby said sleeve is compressed and exerts an increasing radial pressure upon said smaller diametered rod segments extending through said profiled sleeve.

11. A connector for colinear axial alignment of a pair of optical waveguides, comprising:

at least three elongate resilient rod members in parallel relationship defining an interstitial passageway therebetween, each of said rod members having a larger diameter at first and second opposite ends thereof, and a smaller diameter segment extending between said ends;

first means for initially influencing said smaller diameter rod segments radially inward, whereby said passageway has a negatively tapered conical profile extending from each end of said rods for entry of a forward end of a respective one of said pair of waveguides therein, with forward end surfaces of said pair of waveguides positioned in opposed adjacent location intermediate of the length of said rod members;

second means for finally influencing said smaller diametered rod segments radially inward into peripheral engagement with said waveguides, whereby both said waveguides are engaged by and clamped between said rod segments in colinear axial alignment with each other.

12. A connector as set forth in claim 11, said first means comprising:

radially compressible tubular means receiving said rod members therethrough, and holding said rod members in said parallel relationship, said tubular means having first external profiled means therealong; and ferrule means mounted over ends of said tubular means, and engaging said first profiled means for radially compressing said tubular means, whereby said tubular means exerts an initial radial pressure upon said smaller diametered rod segments and deflects said segments inwardly.

13. A connector as set forth in claim 12, said second means comprising:

second external profiled means of said tubular means, said ferrule means being movable into engagement with said second profiled means for further compressing said tubular means, whereby said tubular means exerts a final inward pressure upon said smaller rod segments and said smaller rod segments are thereby influenced radially and into clamping engagement upon said waveguides.

* * * * *